United States Patent [19]
Bernardi et al.

[11] Patent Number: 6,021,278
[45] Date of Patent: Feb. 1, 2000

[54] SPEECH RECOGNITION CAMERA UTILIZING A FLIPPABLE GRAPHICS DISPLAY

[75] Inventors: Bryan D. Bernardi; Chad M. Henry, both of Rochester; Thomas M. Stephany, Churchville, all of N.Y.

[73] Assignee: Eastman Kodak Company, Rochester, N.Y.

[21] Appl. No.: 09/126,147

[22] Filed: Jul. 30, 1998

[51] Int. Cl.⁷ .......................... G03B 13/02; G03B 17/00
[52] U.S. Cl. ................................. 396/57; 396/374
[58] Field of Search ....................... 396/56–59, 297, 396/374, 88, 147, 287, 296, 281; 348/211, 333

[56] References Cited

U.S. PATENT DOCUMENTS

| | | | |
|---|---|---|---|
| 4,389,109 | 6/1983 | Taniguchi et al. | 396/56 |
| 4,757,388 | 7/1988 | Someya et al. | 348/333 |
| 4,837,817 | 6/1989 | Maemori | 348/211 |
| 4,951,079 | 8/1990 | Hoshino et al. | 396/56 |
| 5,557,358 | 9/1996 | Mukai et al. | 396/374 X |
| 5,664,243 | 9/1997 | Okada et al. | 396/374 X |
| 5,749,000 | 5/1998 | Narisawa | 396/147 X |
| 5,774,754 | 6/1998 | Ootsuka | 396/374 X |

*Primary Examiner*—W. B. Perkey
*Attorney, Agent, or Firm*—Peyton C. Watkins

[57] ABSTRACT

A camera for recognizing voice commands, and for visually displaying an image to be captured by the camera with camera operations performed thereon as instructed by the voice commands, the camera comprises a camera body; a microphone disposed on the camera body for inputting voice commands; a controller disposed in the camera body for receiving and recognizing voice commands, and for implementing results of the voice command; and a display attached to the camera body for visually displaying the image to-be-captured by the camera with the camera operations performed thereon as instructed by the voice commands.

10 Claims, 9 Drawing Sheets

SPEECH RECOGNITION CAMERA UTILIZING A FLIPPABLE GRAPHICS DISPLAY

FIELD OF THE INVENTION

This invention relates generally to the field of cameras and, more specifically, to cameras having speech recognition capabilities and a flippable display for viewing the results of certain speech commands.

BACKGROUND OF THE INVENTION

When a camera with speech recognition capabilities is used by a consumer, the camera responds to user inquiries and operating commands by virtue of the spoken word. This capability is known in prior art such as U.S. Pat. No. 4,951,079 by Hoshino et. al. This type of camera, although allowing for remote operation, does not permit proper verification of certain spoken words. For example, if the camera zoom function is executed remotely through a voice command, the camera will respond, however, the user has no way of verifying the composition of the image being captured by the camera. The above-cited U.S. Pat. No. 4,951,079 discloses a visible display that displays symbols illustrating the function that is performed in response to the commands, such as a "1" for zoom and the like.

Although the presently known and utilized camera with voice recognition is satisfactory, it is not without drawbacks. The prior art cameras do not actually display the physical results of the camera operations performed in response to the commands so as to permit user verification of the commands.

SUMMARY OF THE INVENTION

The present invention uses a graphical display to illustrate the results of remotely issued voice recognition commands, such as zoom in, zoom out, flash on, flash off, focus commands, and other related camera commands which are directly related to the image content of the picture to be captured. For example, a command such as flash on would visibly indicate a brighter image in the display, and a command of flash off would show a correspondingly darker image in the display. Thus, the camera user views in real time the consequences of issuing these commands. In addition, the flippable graphic display permits the verification of results of the voice commands from the front of the camera. Thus, the user can be included in the picture while controlling image composition, and upon liking the results, can then command the camera to take the picture.

DETAILED DESCRIPTION OF THE INVENTION

Figure 1:
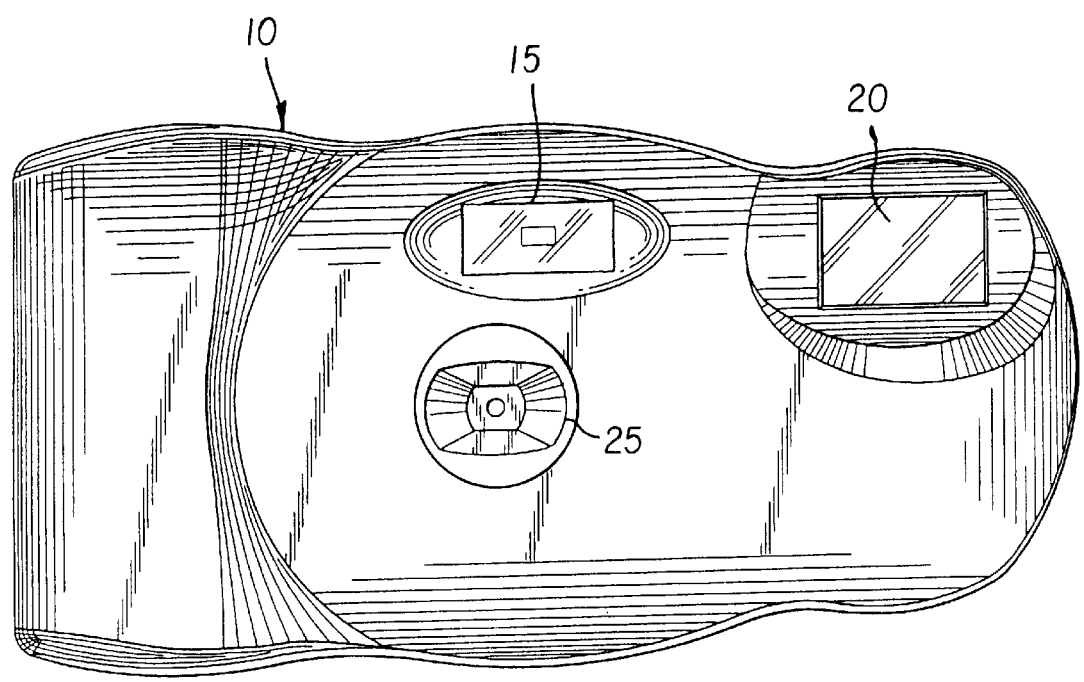
FIG. 1 is a front view of a body for a voice recognition camera according to the present invention.

FIG. 1 is a front view showing a camera body 10 for a voice recognition camera with a viewfinder 15, a flash 20, and a zoom lens 25 for zooming in and out on scenes.

Figure 2A:
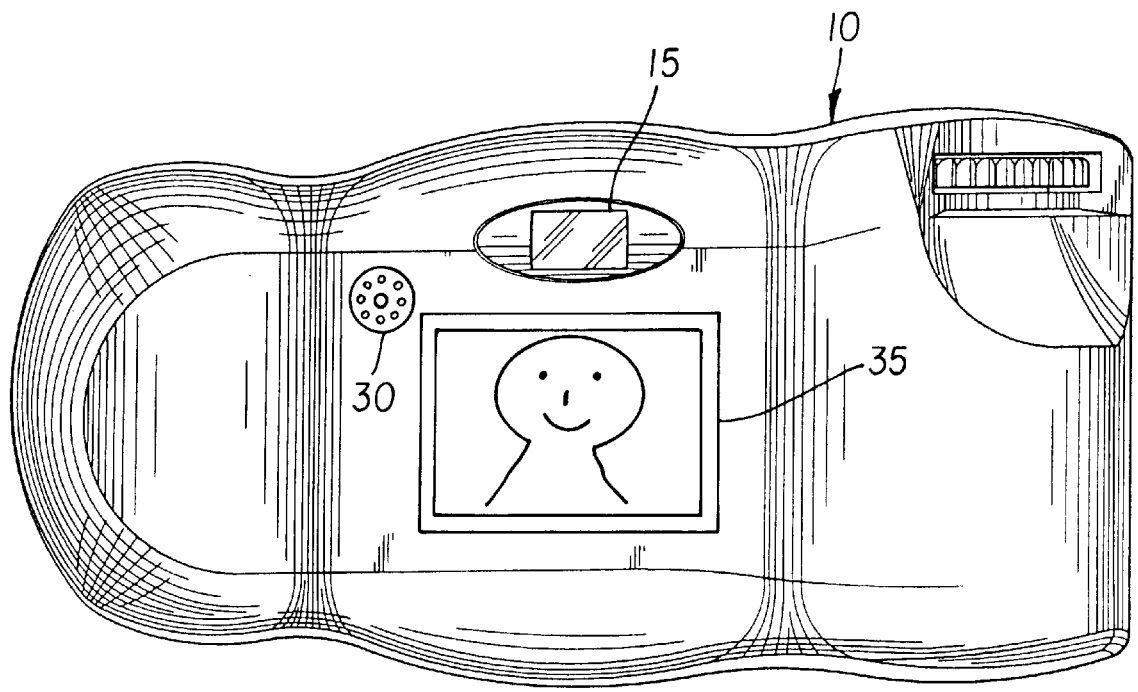
FIG. 2a is a rear view of a voice recognition camera according to the present invention, including a view of the graphic display.

FIG. 2a is a rear view of the voice recognition camera of the present invention showing the camera microphone 30, and a graphic display 35. In addition, this view shows the graphical display 35 displaying scenes viewed through the lens 25 on a real-time basis. In normal use, the user will issue a voice command through the microphone 30, and will see the physical results of the camera operation of the command within the graphic display 35. For instance, if the user chooses a command such as zoom in, the user will see the image enlarged in size within the graphic display 35. In another instance, if the user chooses a command such as flash on, the user will see the image visually brighten within the graphic display 35.

Figure 2B:
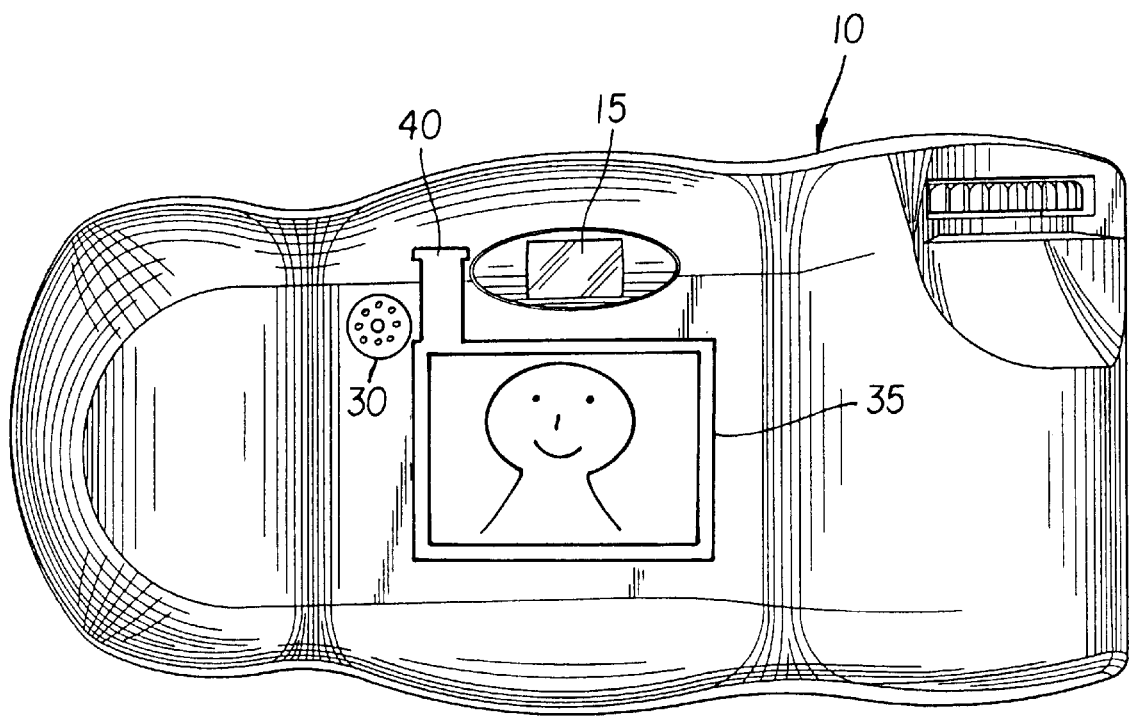
FIG. 2b is an alternate rear view of the voice recognition camera showing the graphical display with a hinge for flipping the display.

FIG. 2b is a alternative rear view of the preferred embodiment of the voice recognition camera of the present invention showing the graphical display 35 moveable upon the camera body 10 by virtue of a hinge 40. The hinge 40 permits the graphical display 35 to be moved to a position above the camera body 10. This permits a user in front of the camera to view the contents of the graphical display 35.

Figure 2C:
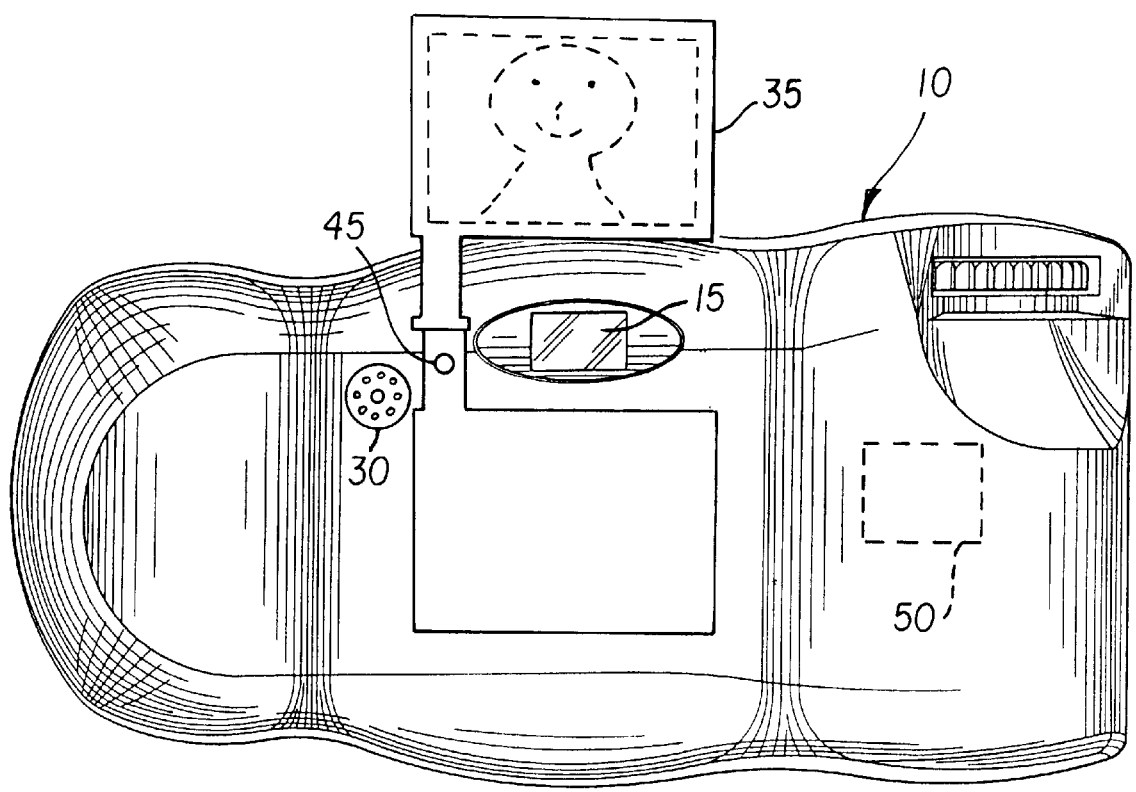
FIG. 2c is an additional rear view of FIG. 2b showing the graphical display deployed above the camera body, with the display contents dashed to indicate viewing an automatically rotated image from the front of the camera.

FIG. 2c is an additional rear view of FIG. 2b illustrating the graphical display 35 deployed above the camera body 10; this is obviously accomplished by manually moving the graphical display 35 upwardly above the camera body 10. A display microswitch 45 is activated upon movement of the display 35 above the camera body 10 for indicating to the microcontroller 50 the orientation of the display 35, the orientation shown in FIG. 2c. The microcontroller 50 will electronically rotate the image in the display 35 one hundred eighty degrees for permitting the user to view the image as seen through the viewfinder 25. In this instance, a user in front of the camera will view an image in the graphic display 35 in the same orientation as a user at the rear of the camera would see while looking through the viewfinder 15.

Figure 2D:
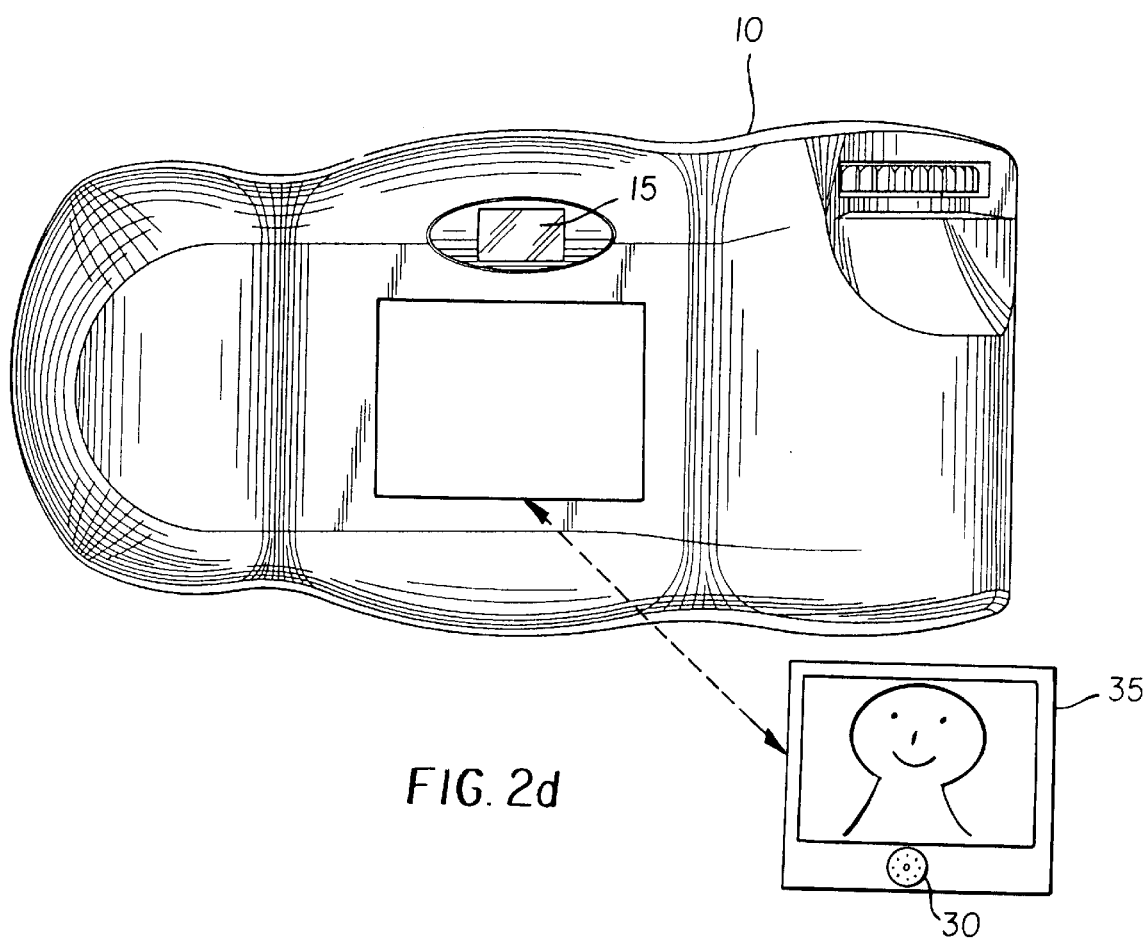
FIG. 2d is another alternative rear view of the voice recognition camera showing the graphic display remotely located from the main camera body.

FIG. 2d is also an alternative embodiment of a rear view of the voice recognition camera of the present invention. In this embodiment, the microphone 30 is attached to the graphical display 35 which is, in turn, physically detachable from the main camera body 10. The graphical display 35 communicates with the microcontroller 50 via a wired or wireless communication link, as illustrated by the dashed line. The wireless communication link may be accomplished by any means well known in the art and will not, therefore, be discussed in detail herein.

Figure 2E:
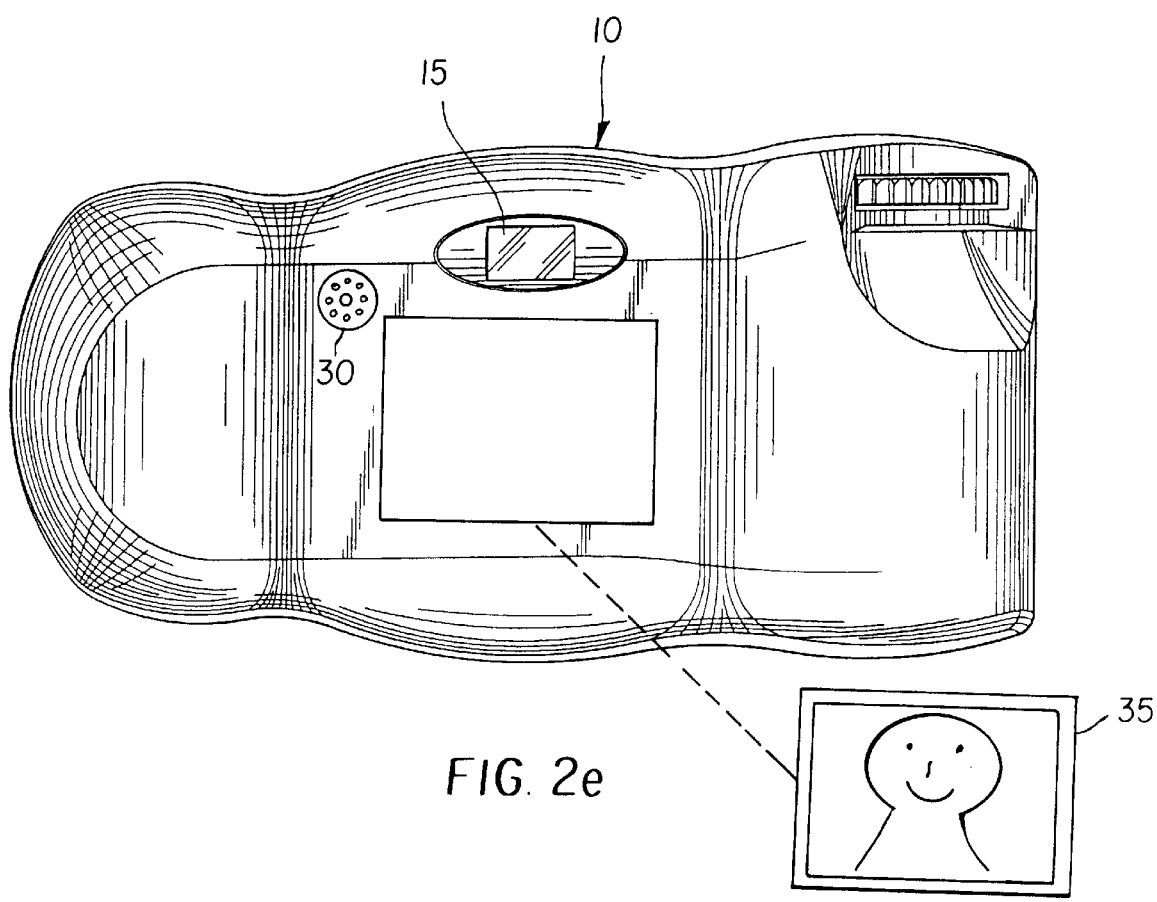
FIG. 2e is another rear view of the voice recognition camera showing the graphic display removed as a module from the main camera body as in FIG. 2d; however, a microphone is attached to the main camera body.

FIG. 2e is another alternative rear view of the voice recognition camera of the present invention. In this embodiment, the microphone 30 is shown attached to the camera body 10. The graphical display 35 is detached and disposed apart from the main camera body 10, as shown by the dashed line indicating a wired or wireless link between the camera body 10 and graphic display 35.

Figure 2F:
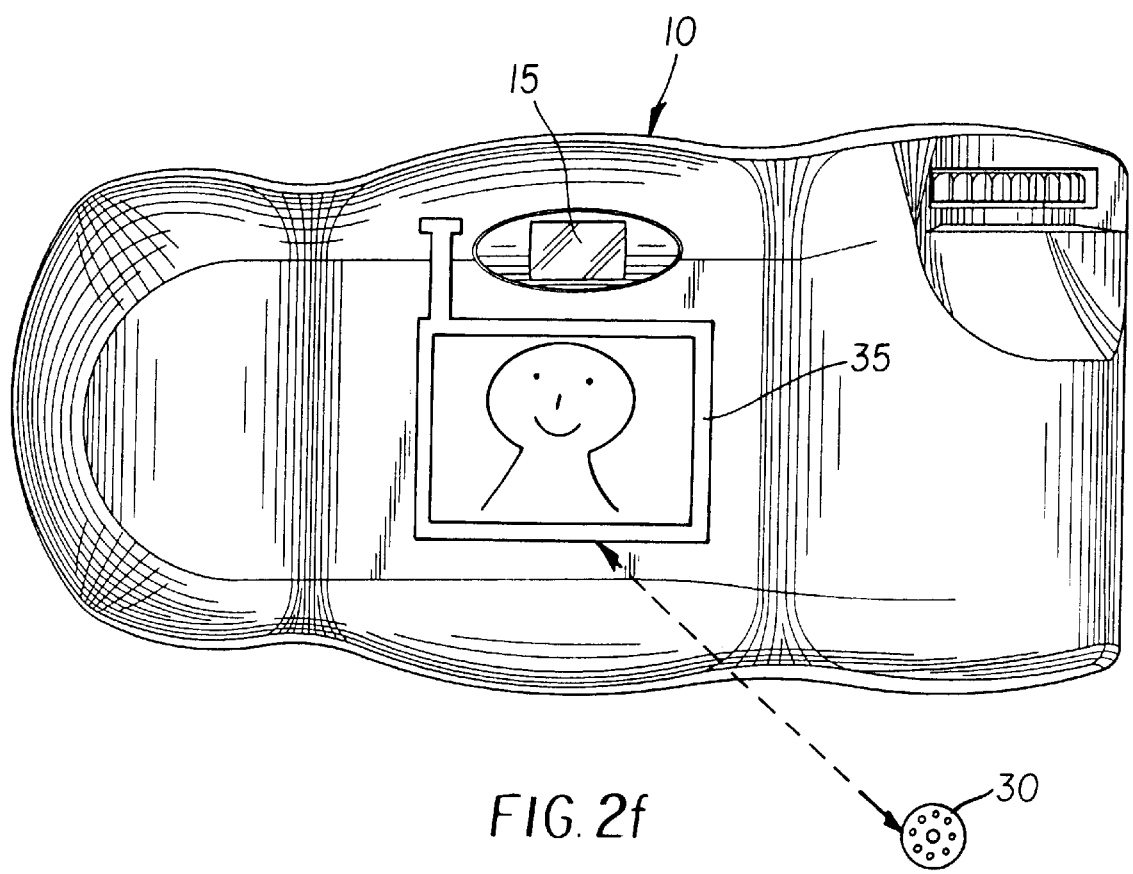
FIG. 2f is another rear view of the voice recognition camera showing the microphone removed from the main camera body as in FIG. 2d; however, the graphical display is on the main camera body.

FIG. 2f is still another alternative embodiment of a rear view of the voice recognition camera of the present invention. The graphic display 35 is shown disposed on the camera body 10, and a remote microphone 30 is physically separated from the camera body 10, as illustrated by the dashed line, indicating a wired or wireless link between the camera body 10 and remote microphone 30.

Figure 3:
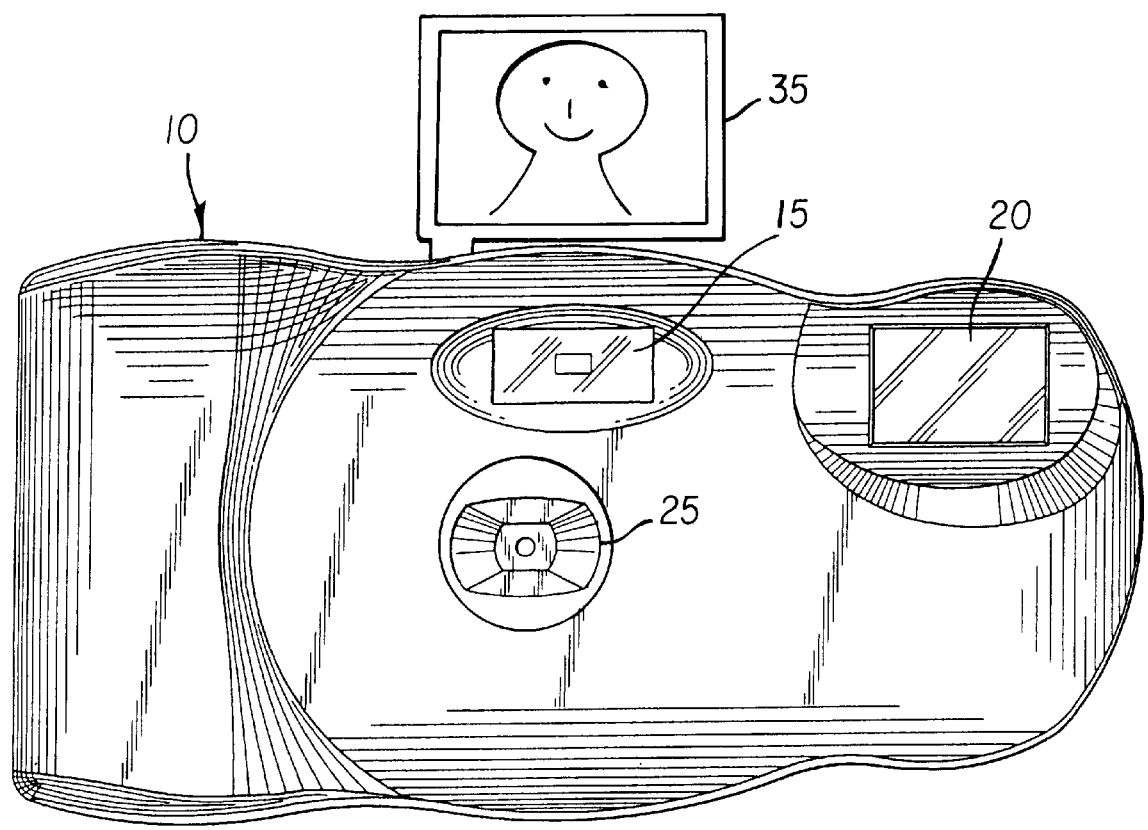
FIG. 3 shows a front view of the voice recognition camera with the graphic display deployed above the camera.

FIG. 3 is a front view of the preferred embodiment of the voice recognition camera of the present invention. The graphic display 35 is shown attached to the camera body and positioned above the camera body 10. The graphical display 35 displays the image in an orientation as a user at the rear of the camera would see while looking through the viewfinder 15.

Figure 4:
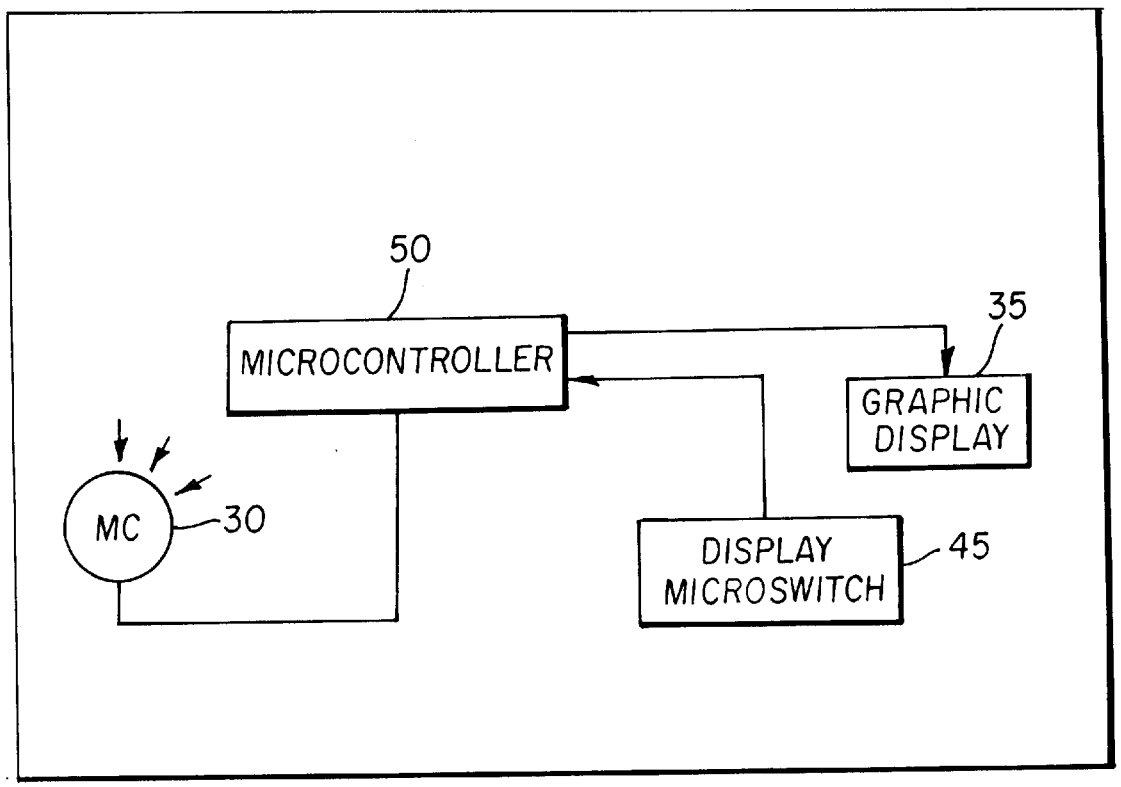
FIG. 4 is a block diagram of the voice recognition camera showing a microphone, microcontroller, and graphical display.

FIG. 4 is a block diagram of the voice recognition camera of the present invention. The user inputs voice commands through the microphone 30 and the microcontroller 50, such as a Sensory RSC-164 chip, recognizes the voice command and operates the intended function. Such voice recognition can be that as in U.S. Pat. No. 4,951,079. In the preferred embodiment, the microswitch 45 sends a signal to the microprocessor 50 for indicating the current state of the microswitch 45. If the microcontroller 50 determines that the microswitch 45 is activated, the image would be automatically rotated one hundred eighty degrees by the microcontroller 50, and then sent to the graphical display 35. If the microcontroller 50 determines that the microswitch 45 is not activated, the image would be sent to the graphical display 35 as normal.

In the alternate embodiments, the camera microcontroller 50 will operate the remote interface, such as a wire serial link or wireless infrared link, between the camera and graphic display 35 and/or microphone 30. In this situation the image would be sent to the graphic display as normal.

Although the present invention has been fully described with reference to the preferred embodiments thereof, many modifications and variations thereof will be apparent to those skilled in the art without departing from the spirit and scope thereof.

PARTS LIST 10 camera body
15 viewfinder
20 flash
25 zoom capable taking lens
30 microphone
35 graphic display
40 hinge
45 microswitch
50 microcontroller

What is claimed is:

1. A camera for recognizing voice commands, and for visually displaying an image to be captured by the camera with camera operations performed thereon as instructed by the voice commands, the camera comprising:

(a) a camera body;
   (b) a microphone disposed on said camera body for inputting voice commands;
   (c) a controller disposed in said camera body for receiving and recognizing voice commands that change the composition of the image, and for implementing results of the voice command; and
   (d) a movable display attached to said camera body for visually displaying the image to-be-captured by the camera with the camera operations performed thereon as instructed by the voice commands, said display being movable on the camera body to a position that permits a user in front of the camera to view the contents of the display in the same orientation as would be viewed at the rear of the camera while looking through a viewfinder.

2. The camera as in claim 1 further comprising a sensor for sensing positions of said display.

3. A camera for recognizing voice commands, and for visually displaying an image to-be-captured by the camera with camera operations performed thereon as instructed by the voice commands, the camera comprising:

(a) a camera body;
   (b) a controller disposed in said camera body for receiving and recognizing voice commands that change the composition of the image, and for implementing results of the voice commands;
   (c) a remote microphone that communicates with said controller for inputting voice commands; and
   (d) a movable display attached to said camera body for visually displaying an image to-be-captured by the camera with camera operations performed thereon as instructed by the voice commands, said display being movable on the camera body to a position that permits a user in front of the camera to view the contents of the display in the same orientation as would be viewed at the rear of the camera while looking through a viewfinder.

4. The camera as in claim 3 further comprising a sensor for sensing positions of said display.

5. A camera for recognizing voice commands, and for visually displaying an image to-be-captured by the camera with camera operations performed thereon as instructed by the voice commands, the camera comprising:

(a) a camera body;
   (b) a controller disposed in said camera body for receiving and recognizing voice commands that change the composition of the image, and for implementing results of the voice commands;
   (c) a remote microphone that communicates with said controller for inputting voice commands; and
   (d) a remote display that communicates with said controller for visually displaying the image to-be-captured by the camera with camera operations performed thereon as instructed by the voice commands.

6. The camera as in claim 5, wherein said display is detachable from the camera body.

7. The camera as in claim 6, wherein said display displays the image to-be-captured in an orientation as would be viewed at the rear of the camera while looking through a viewfinder.

8. The camera as in claim 6 wherein said remote microphone is included with said display.

9. A camera for recognizing voice commands, and for visually displaying an image to-be-captured by the camera with camera operations performed thereon as instructed by the voice commands, the camera comprising:

(a) a camera body;
   (b) a controller disposed in said camera body for receiving and recognizing voice commands that change the composition of the image, and for implementing results of the voice commands;

(c) a microphone disposed on said camera body for inputting voice commands; and (d) a remote display detachable from the camera body that communicates with said controller for visually displaying the image to-be-captured by the camera with camera operations performed thereon as instructed by the voice commands.

10. The camera as in claim 9, wherein said display displays the image to-be-captured in an orientation as would be viewed at the rear of the camera while looking through a viewfinder.

* * * * *